US010395170B1

(12) United States Patent
Icar et al.

(10) Patent No.: US 10,395,170 B1
(45) Date of Patent: Aug. 27, 2019

(54) METHOD AND APPARATUS FOR IDENTIFYING PREPARATIONS FOR PRODUCTION OF TARGET MATERIALS

(71) Applicant: Terrogence Ltd., Bnei Zion (IL)

(72) Inventors: Avi Icar, Bnei Zion (IL); Bogdan Belgorodsky, Bnei Zion (IL)

(73) Assignee: CSA Technologies Ltd., Mishmar David (IL)

( * ) Notice: Subject to any disclaimer, the term of this patent is extended or adjusted under 35 U.S.C. 154(b) by 21 days.

(21) Appl. No.: 13/783,518

(22) Filed: Mar. 4, 2013

(51) Int. Cl.
*G06N 5/02* (2006.01)
*G06N 20/00* (2019.01)

(52) U.S. Cl.
CPC ............... *G06N 5/02* (2013.01); *G06N 20/00* (2019.01)

(58) Field of Classification Search
CPC .................................. G06N 5/02; G06N 20/00
See application file for complete search history.

(56) References Cited

U.S. PATENT DOCUMENTS

| 7,254,501 | B1 * | 8/2007 | Brown | G01J 3/28 702/28 |
| 8,224,764 | B1 * | 7/2012 | Ouzounian | 706/50 |
| 2002/0169755 | A1 * | 11/2002 | Framroze | G16C 20/40 |
| 2003/0144800 | A1 * | 7/2003 | Davis | B07C 1/00 702/22 |
| 2005/0004770 | A1 * | 1/2005 | Ouzounian | 702/22 |
| 2008/0300826 | A1 * | 12/2008 | Schweitzer | G06K 9/00536 702/181 |
| 2008/0312768 | A1 * | 12/2008 | Ewing | G01N 33/227 700/225 |
| 2013/0114070 | A1 * | 5/2013 | Gardner, Jr. | G01J 3/02 356/73 |

* cited by examiner

*Primary Examiner* — Eric Nilsson
(74) *Attorney, Agent, or Firm* — Roach Brown McCarthy & Gruber, P.C.; Kevin D. McCarthy

(57) ABSTRACT

A method for determining a probability that ingredient materials found at a scene will be used for producing a target material, the method comprising using at least one hardware processor for: receiving input related to at least one ingredient material found at a scene; determining an ingredient material score from the input, the ingredient material score indicating a probability that the at least one ingredient material is found at the scene; and determining a target material score associated with a target material, the score indicative of a probability that the at least one ingredient material is used for producing the target material, wherein the target material score relates to a ratio between a sum of the ingredient material score of materials required for producing the target material and detected at the scene, and a number of ingredient materials required for producing the target material.

17 Claims, 6 Drawing Sheets

400

ADD EVIDENCE SPECIFIED BY: ● MATERIAL NAME  ○ SPECTROMETER  ○ MATERIAL PROPS.  ○ FINDING
408                          420                412                   416         404

[X] MATERIAL NAME
428

[ ALUMINUM  V ]  432
       436        424

[X] MATERIAL PROPERTIES

AGGREGATION STATE    COLOR         GRAIN SIZE
[ SOLID   V ]        [ BLACK  V ]  [ SMALL  V ]
     444                452             460
          456

[X] MATERIAL PROPERTIES

AGGREGATION STATE    COLOR         VISCOSITY
[ LIQUID  V ]        [ BLACK  V ]  [ HIGH   V ]
     472                468             480

[X] FINDING

[ REFRIGERATOR  V ]  492
     496            488

[ SUBMIT ]      [ CANCEL ]
   498             499

METHOD AND APPARATUS FOR
IDENTIFYING PREPARATIONS FOR
PRODUCTION OF TARGET MATERIALS

FIELD OF THE INVENTION

The invention relates to identifying materials and equipment that can be used for generating hazardous materials.

BACKGROUND

Dangerous materials, which are sometimes related to as hazardous materials or HazMat, are solids, liquids, or gases that can harm people, other living organisms, property, or the environment. Hazardous materials include materials which may be radioactive, flammable, explosive, corrosive, oxidizing, asphyxiating, biohazardous, toxic, pathogenic, allergenic, or the like.

Some hazardous materials are dual materials, i.e., they have everyday usages for example cleaning, in addition to other usages which may be illegitimate in certain circumstances, such as explosives handled by uncertified people or in uncertified environments.

Some hazardous materials can be obtained and stored as is, while the production of other hazardous materials may require base materials and certain processes to be applied upon the base materials. In some cases, multiple stages may be required, in which base materials are processed to produce intermediate materials, which are further processed to generate the hazardous materials. It will be appreciated that any number of processing stages may be required to produce the hazardous materials.

In some situations, entities such as law enforcement agencies may be provided with information related to a location in which hazardous materials may be produced.

Referring now to FIG. 1, showing an exemplary illustration of a scene found in such location. The scene may contain any number of materials of different structures, states of aggregation, colors or other properties, such as the liquid materials in bottles 104, 108, 112, or 116, solid materials such as the materials in containers 120 or 124, or others.

Some of the materials may be of dual usage, such as nail polish 128 which has everyday usage, but may also be used for extracting Triacetone Triperoxide (TATP) which is hazardous.

Also, some materials may be identified by labels attached to their containers, such as bottle 104 or container 120. However, the label may sometime be erroneous. Other materials such as the materials in bottles 108, 112 or 116, or container 124 may be unidentified, at least to a non-skilled person. In many cases, even a skilled person may have difficulties identifying a material without taking a closer look, smelling or otherwise examining it, which may also be dangerous.

The scene may also comprise machinery or other equipment which can be used in the production of hazardous materials, but which may also have innocent usages, such as refrigerator 132, blow drier (not shown) or others.

A law enforcement person having arrived at a scene, has to determine out of all the materials and equipment found in the scene as shown in exemplary FIG. 1, whether hazardous materials are produced or can be produced at the scene. In some situations, not all materials required for producing a hazardous material are found at the scene, but a skilled person can identify that the findings may aim at preparations for such production.

However, a non-skilled person is likely to have difficulties identifying all the found materials, and determining whether the findings may be used for producing materials and in particular hazardous materials. It will be appreciated that a law enforcement agency can generally not afford to send a professional chemist to each such mission, and that even skilled personnel may face said difficulties.

There is therefore a need in the art for a method and apparatus for assisting in determining based on findings at a scene whether the findings can be used for producing hazardous materials, and which hazardous materials.

SUMMARY

One aspect of the disclosure relates to a method for determining probability that ingredient materials found at a scene will be used for producing a target material, the method comprising using at least one processor for: receiving input related to one or more ingredient materials found at a scene; determining an ingredient material score from the input, the ingredient material score indicating a probability that any of the ingredient materials is found at the scene; and determining a target material score associated with a target material, the score indicative of a probability that the ingredient material is used for producing the target material, wherein the target material score relates to a ratio between a sum of the ingredient material score of materials required for producing the target material and detected at the scene, and a number of ingredient materials required for producing the target material.

In some embodiments of the method, the input is received from a source selected from the group consisting of: ingredient material name; ingredient material description; a finding; and data received from spectroscopic equipment.

In some embodiments of the method, the ingredient material score is related to the source from which input relates to the ingredient material was received.

In some embodiments of the method, an ingredient material for which input was received by an ingredient material name or from spectroscopic equipment, receives higher score than an ingredient material for which input was received by an ingredient material description or a finding.

In some embodiments, the method further comprises determining a target material score for further target materials, wherein the target material is added to the ingredient materials.

In some embodiments, the method further comprises displaying a list of target materials, the list comprising a target material having a highest target material score.

In some embodiments, the method further comprises displaying a list of hazardous target materials, the list comprising a hazardous target material having a highest target material score.

In some embodiments of the method, the target material score relates to a ratio between a sum of the ingredient material score of materials common in producing the target material and detected at the scene by, and a number of ingredient materials common producing the target material.

In some embodiments of the method, the target material score relates to a ratio between a sum of the ingredient material score of materials optionally used in producing the target material and detected at the scene by, and a number of ingredient materials optionally used in producing the target material.

In some embodiments of the method, the target material score relates to a ratio between a number of processes required for producing the target material and can be performed at the scene, and a number of processes required for producing the target material.

In some embodiments of the method, the target material score relates to a ratio between a number of processes common in producing the target material and can be performed at the scene, and a number of processes common in producing the target material.

In some embodiments of the method, the target material score relates to a ratio between a number of processes optionally used in producing the target material and can be performed at the scene, and a number of processes optionally used in producing the target material.

Another aspect of the disclosure relates to a method for determining probability that ingredient materials found at a scene will be used for producing a target material, the method comprising using at least one processor for: receiving input related to one or more ingredient materials found at a scene; determining an ingredient material score from the input, the ingredient material score indicating a probability that the one or more of the ingredient materials is found at the scene; and determining a target material score associated with a target material, the score indicative of a probability that the ingredient material is used for producing the target material, wherein the target material score relates to two or more ratios, each of the two ratios multiplied by a coefficient, the ratios selected from the list consisting of: the ratio between the sum of the ingredient material score of materials required for producing the target material and detected at the scene, and a number of ingredient materials required for producing the target material; a ratio between a sum of the ingredient material score of materials common in producing the target material and detected at the scene by, and a number of ingredient materials common producing the target material; a ratio between a sum of the ingredient material score of materials optionally used in producing the target material and detected at the scene by, and a number of ingredient materials optionally used in producing the target material; a ratio between a number of processes required for producing the target material and can be performed at the scene, and a number of processes required for producing the target material; a ratio between a number of processes common in producing the target material and can be performed at the scene, and a number of processes common in producing the target material; and a ratio between a number of processes optionally used in producing the target material and can be performed at the scene, and a number of processes optionally used in producing the target material.

Yet another aspect of the disclosure relates to an apparatus for determining probability that ingredient materials found at a scene will be used for producing a target material, comprising: a non-transitory memory having stored thereon a material database for storing information related to one or more ingredient materials and one or more target materials; one or more input components for receiving data related to one or more ingredient materials found at a scene; and a hardware processor configured to operate: (a) a found material search and score component for identifying one or more of the ingredient materials and an associated material score, and (b) a material signature scoring component for determining a score associated with a target material, the score indicative of a probability that one or more of the ingredient materials is used for producing one or more of the target material, wherein the score relates to a ratio between a sum of the ingredient material score of materials required for producing the target material and detected at the scene by the found material search and score component, and a number of ingredients required for producing the target material.

In some embodiments of the apparatus, the input component is selected from the group consisting of: material name reporting component; material description; reporting component; findings reporting component; and interface to spectroscopic equipment.

In some embodiments, the apparatus further comprises one or more output components for displaying a list of target materials that can be produced from materials found at the scene.

In some embodiments of the apparatus the target material score relates to two or more ratios, each of the ratios multiplied by a coefficient, the ratios selected from the list consisting of: the ratio between the sum of the ingredient material score of materials required for producing the target material and detected at the scene, and a number of ingredient materials required for producing the target material; a ratio between a sum of the ingredient material score of materials common in producing the target material and detected at the scene by, and a number of ingredient materials common producing the target material; a ratio between a sum of the ingredient material score of materials optionally used in producing the target material and detected at the scene by, and a number of ingredient materials optionally used in producing the target material; a ratio between a number of processes required for producing the target material and can be performed at the scene, and a number of processes required for producing the target material; a ratio between a number of processes common in producing the target material and can be performed at the scene, and a number of processes common in producing the target material; and a ratio between a number of processes optionally used in producing the target material and can be performed at the scene, and a number of processes optionally used in producing the target material.

Yet another aspect of the disclosure relates to a computer program product comprising: a non-transitory computer readable medium; a first program instruction for receiving input related to one or more ingredient materials found at a scene; a second program instruction for determining an ingredient material score from the input, the ingredient material score indicating a probability that one or more of the one ingredient materials is found at the scene; and a third program instruction for determining a target material score associated with a target material, the score indicative of a probability that the ingredient material is used for producing the target material, wherein the target material score relates to a ratio between a sum of the ingredient material score of materials required for producing the target material and detected at the scene, and a number of ingredient materials required for producing the target material, and wherein said first, second and third program instructions are stored on said non-transitory computer readable medium.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 4 is an exemplary user interface for entering description of materials found at a scene, in accordance with some exemplary embodiments of the invention;

FIG. 6 is an exemplary user interface for displaying names or properties of materials associated with a scene, in accordance with some exemplary embodiments of the invention.

DETAILED DESCRIPTION

Figure 1:
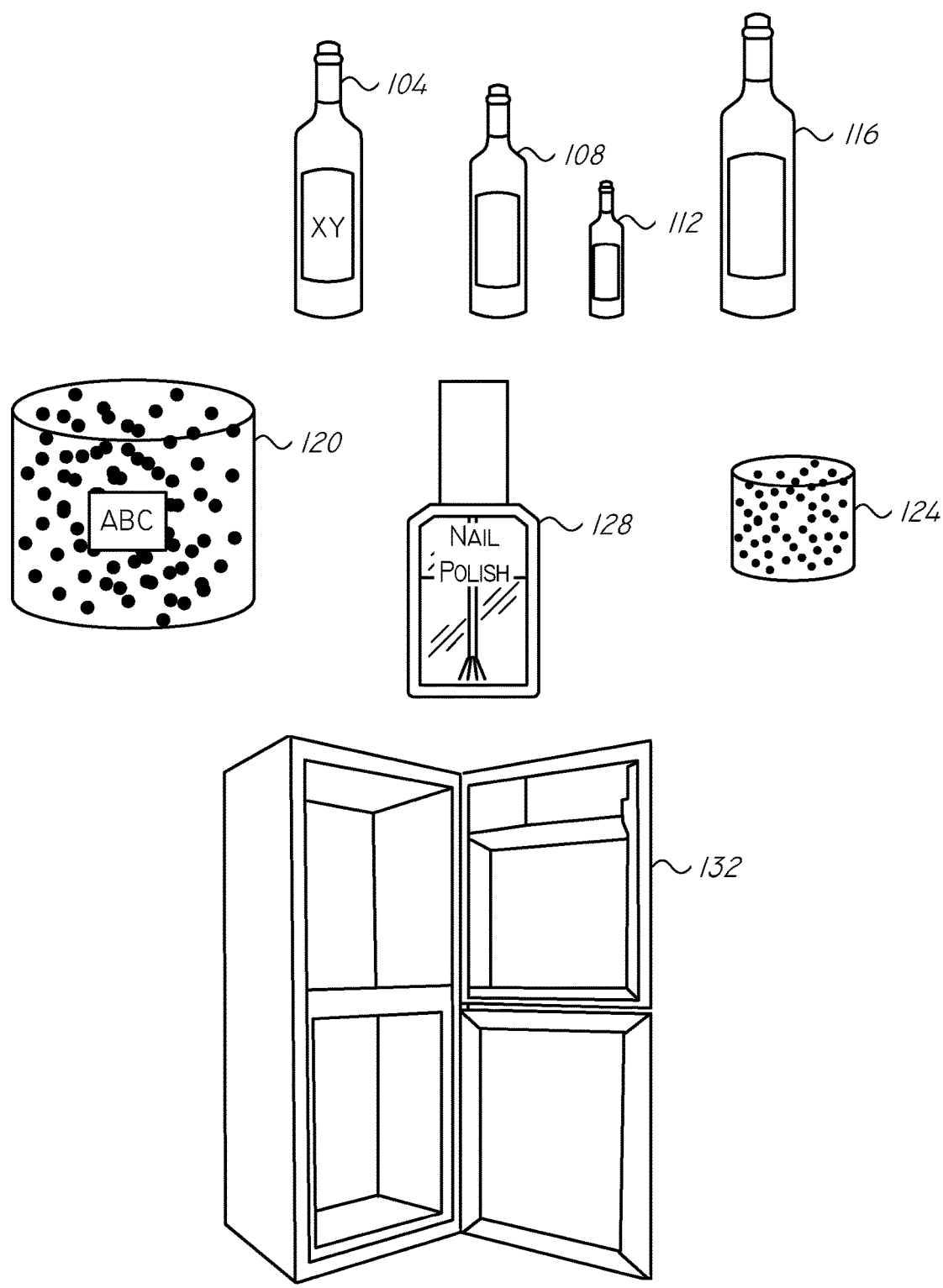
FIG. 1 shows a scene in which multiple materials and some equipment are found.

The following description relates to identifying whether materials found at a location, sometimes referred to as ingredient materials, are likely to be used directly or indirectly in production of further materials and in particular hazardous materials, sometimes referred to as target materials.

One technical problem handled by the disclosed method and apparatus relates to a situation in which materials and equipment are found at a scene comprising one or more locations such as rooms, apartments, houses, garages, or the like. It is required to determine whether the found materials and equipment may be used in production of hazardous materials, and which hazardous materials. without specific knowledge in chemistry, materials, or the like.

One technical solution is to provide a user, which is not required to have any specific knowledge for example in chemistry, with a system, for example a computerized system.

The system comprises a knowledge base related to known materials, including dual materials, base materials, intermediate materials and hazardous materials. For each such material, multiple details are available, which may include name, formula, chemical characteristics, appearance characteristics, materials that can be produced using the found material, ingredients for producing the found material and others.

Dual materials are materials which may have common innocent usage, but can also be used as hazardous materials or as an ingredient in producing hazardous materials.

Intermediate materials are materials from which hazardous materials can be produced.

Base materials are materials which can be used in the process of producing hazardous materials.

It will be appreciated that the categories of dual materials, hazardous materials, intermediate materials and base materials are not mutually exclusive and that many materials can belong to more than one category.

For each intermediate or hazardous material, a recipe is provided which comprises the base or intermediate materials required for production, and optionally the required processing to be applied to the base or intermediate materials, such as cooling, heating, etc.

In some exemplary embodiments, each material or hazardous material can be associated with one or more critical materials, or one or more optional materials required for its production. In other embodiments, hazardous materials can be associated only with required ingredients. In some further embodiments the critical/optional scale can be extended to include any number of degrees, for example three degrees: critical ingredients, common ingredients, and optional ingredients.

The same or a different criticality scale can be applied to processing steps, such as critical processes, common processes and optional processes.

The system receives from the user information related to the materials and equipment found at the scene. If known, the user can provide the names of materials found at the scene, such as "Sulfuric Acid". Otherwise, the user can provide a description of each material. The description can include information such as but not limited to state of aggregation, color, shape, special storage conditions, or others. If the material is in liquid form then further details may include for example transparency, thickness, oiliness, viscosity, or others. If the material is in powder form further details may include for example grain size, grain structure, or the like.

The user can also provide information about findings in the site, which may or may not be related to producing hazardous materials. For example, nail polish is a dual material which can be used for innocent purposes as well as for extracting acetone which may be used in hazardous materials production.

Further information may be provided which relates to findings at the site, including dual usage materials for example nail polish which is a dual material that can be used for innocent purposes as well as for extracting acetone, and machines like a refrigerator, blow drier or others, which may or may not be related to producing hazardous materials.

The system may also receive information from automatic sources such as spectroscopic information obtained from a spectrometer.

The system then identifies and creates a collection of possible materials, whose definitions comply at least to a certain degree with the description provided for materials found at the site. In some cases, the provided description may not be full or even sufficient, in which case multiple materials may be suggested and added to the collection. In some embodiments, a score indicating a confidence degree in the existence at the scene of any one or more materials can be determined.

In some embodiments, the score related to the identification of each material may also be combined with a coefficient related to how the material was identified. For example, a material identified by the user may be associated with a higher coefficient than the same material if recognized according to some visual properties.

In some embodiments, the coefficient can be set to a number smaller than 1 or any other predetermined number, in order to generate a comparable scale.

Introducing the coefficient separately from the score enables greater flexibility. For example, different coefficients may be used according to whether the user is an experienced person or a novice.

The system then tries to determine one or more target or other materials for which one or more ingredients match with materials or processes found at the scene. The required ingredients and processes, which when combined in an orderly recipe may also be referred to as the target material signature, are compared against the materials and equipment available at the scene, and a score is determined for each target material indicating the probability that the found materials may be used in producing the target material.

This stage can be repeated one or more times. For example, if an intermediate material can be produced from a collection of materials found at a scene, the intermediate material can be added to the collection, followed by repeating the process in order to identify further materials that can be produced from the extended collection.

In some embodiments, the score assigned to each material, for example a hazardous material that can be produced, may be determined in accordance with the ratio between the number of materials found in the scene and required for producing the target material, and the number of materials required for producing the target material.

In those embodiments in which different ingredients are associated with different levels of criticality for producing a target material, a separate ratio can be determined for the materials having the same level of criticality, and the ratios can be summed or otherwise combined, wherein each such ratio may be associated with a different coefficient or weight. In some embodiments, the weight associated with the critical materials ratio may be higher than the weights given to other ratios.

Similar one or more ratios can be determined for the processes associated with each target material, whether the processes are classified as required or no required, or more criticality degrees are defined.

In some embodiments, thresholds may be applied in some stages of the method. For example, only found materials for which their identification score is higher than a first threshold may be taken into account; in determining a ratio associated with a target material, only target materials that have a score exceeding a second threshold may be added to the collection, etc.

One technical effect of the disclosed subject matter is providing law enforcement personnel without extensive knowledge in chemistry with a tool for identifying hazardous materials that can be produced at a site, or that preparations for such production are being made. Such system and method may provide a solution that is equivalent to sending a professional chemist to each site, thus enabling significant reduction in the associated costs and resources, endangering fewer people, and optionally receiving results in less time so that preventive measures can be taken more effectively.

Figure 2:
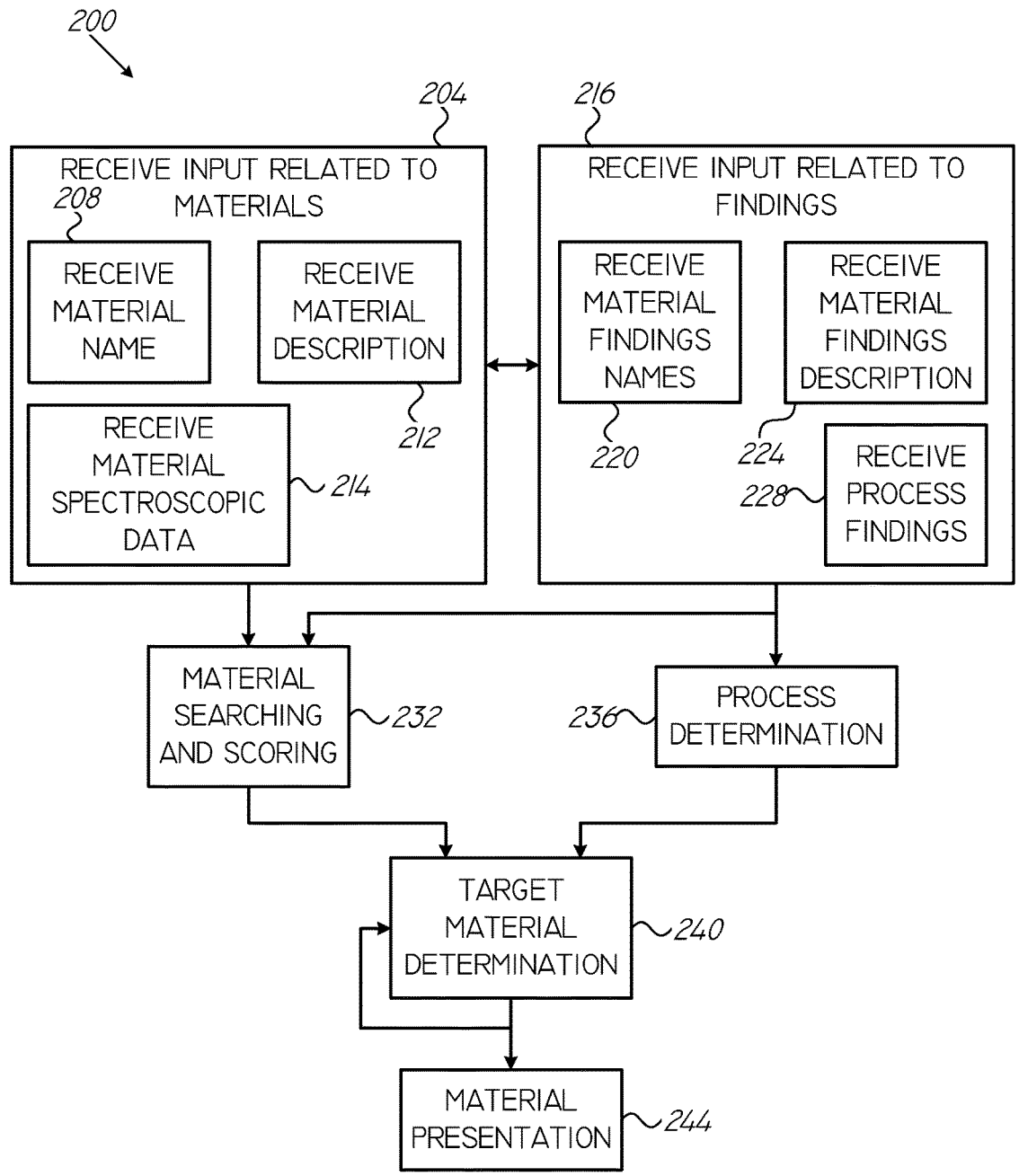
FIG. 2 is a flowchart of steps in a method for determining whether materials found at a scene can be used for producing hazardous materials, in accordance with some exemplary embodiments of the invention.

Referring now to FIG. 2, showing a flowchart of steps in a method 200 for determining the probability that materials and equipment found at a scene may be useful in producing hazardous or other materials.

On input steps 204 and 216, input is received from a user regarding materials and other findings found at a scene location.

On material Searching and scoring step 232 and processes determination step 236, the materials and processes available at the scene, respectively, are determined from the user input. On material determination and scoring step 232, a score may be associated with the identified material, representing a degree of certainty that the identified material is indeed the material found at the scene. For example, if the material is input by its properties, it will be appreciated that more matching properties will generally provide for higher score.

On hazardous materials determination step 240 a probability that the identified materials can be used for a target material is determined for one or more target materials, and on material presentation step 244 some of the hazardous materials and optionally base or intermediate materials may be presented to the user.

On step 204 the system receives input from the user regarding materials found on the scene. On optional step 208, the system receives the name or other identification of a material, if the user happens to know the name. The name may be entered via a keyboard or selected from a predetermined list of materials available to the system.

On optional step 212, the system receives a description of a material by its properties. The description may relate to properties such as state of aggregation, color, etc. Some properties may be conditioned on previously entered properties. For example if the material is liquid, the user may enter information related to viscosity, wherein if the material is in powder form the user may report grain size or grain shape.

On optional step 214, the system receives spectroscopic data related a material, through a suitable interface between spectroscopic equipment and the system.

It will be appreciated that any of steps 204 may be repeated to report any number of materials found on the scene. It will also be appreciated that at least one of step 208 and 212 takes place for each reported material.

The materials reported on step 204 may be base materials, intermediate materials, hazardous materials or dual materials.

On optional steps 216, the system may receive information related to other findings on the scene from a user. On optional step 220, the system may receive information related to identified objects or materials found on the scene, which may or may not be related to producing target materials, such as nail polish.

On optional step 224, the system may receive information related to other objects or materials found on the scene which may not be identified, but rather described by their properties, similar to the properties reported on step 212 above.

On optional step 228, the system may receive information related to processes that may be activated on the scene. The information may relate to the process itself, such as "cooling" or to equipment for carrying out the process, such as "refrigerator" or "dry ice". Input steps 204 and 216 are further exemplified in association with FIG. 4 below.

On material searching and scoring step 232, target materials are searched upon the materials and descriptions reported on steps 204, and upon the materials reported as finding on steps 220 or 224. The target materials are searched in accordance with the matching between their properties or spectroscopic data and the corresponding characteristics of known materials. Material searching and scoring step 232 can be operative in determining base materials, intermediate materials, and hazardous materials.

It will be appreciated that if the description provided for a found material is insufficient, multiple materials can be suggested by the system, wherein the materials may be ordered or ranked in accordance with their compliance or matching to the known materials.

On optional process determination step 236, processes may be determined from the findings reported on steps 216. For example, a refrigerator found in the scene may be determined to enable a cooling process.

On target material determination step 240 further materials can be determined and added to the collection. For example, if on steps 232 one or more base materials had been determined, on step 240 one or more intermediate materials or hazardous material may be determined which can be produced from the base materials. The determined materials may then be added to the collection. Step 240 may be repeated as long as new target materials are identified from the materials in the collection.

Optionally, each target material is associated with a score indicating the certainty degree that the found materials can indeed be used for producing the target material.

The process of determining target materials that can be produced from existing materials is further detailed in association with FIG. 5 below.

On step 244 the hazardous materials and optionally base or intermediate materials determined are presented to a user. Optionally, the materials are presented in a list form, and the user can select any material from the list and view associated details, properties, a picture, a recipe, further materials that can be produced from that material, or any other information available in the system for the material. Presentation step 244 is further exemplified in association with FIG. 6 below.

Figure 3:
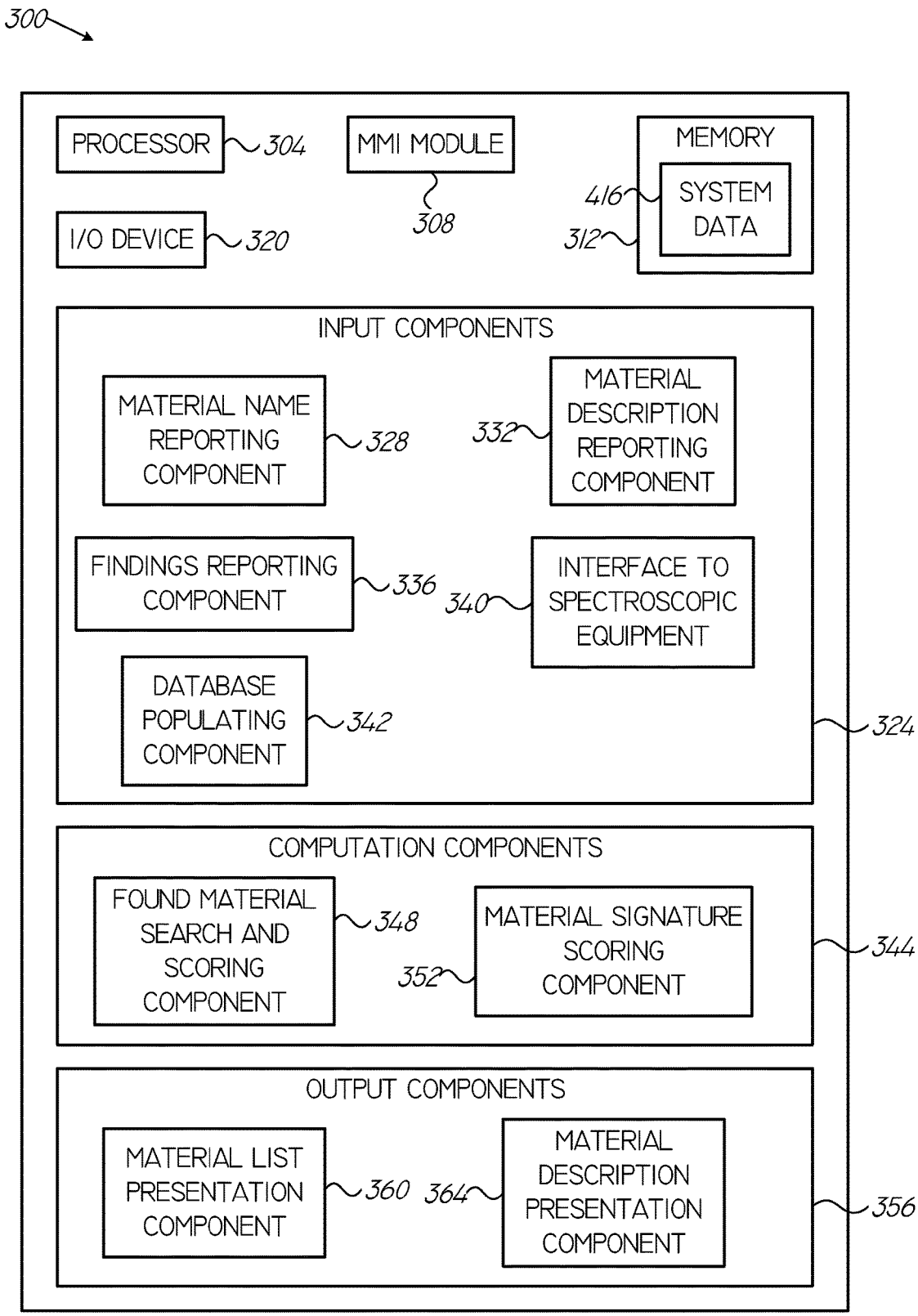
FIG. 3 is a flowchart of steps in a method for determining whether materials found at a scene can be used for producing hazardous materials, in accordance with some exemplary embodiments of the invention.

Referring now to FIG. 3, showing a block diagram of components in an apparatus 300 for determining the probability that materials and equipment found at a scene are useful in the production of hazardous materials. Apparatus 300 comprises a processor 304. Processor 304 may be any Central Processing Unit (CPU), a microprocessor, an electronic circuit, an Integrated Circuit (IC) or the like. Alternatively, apparatus 300 can be implemented as hardware or configurable hardware such as field programmable gate array (FPGA) or application specific integrated circuit (ASIC). In yet other alternatives, processor 304 can be implemented as firmware written for or ported to a specific processor such as digital signal processor (DSP) or microcontrollers. Processor 304 may be used for perfoming mathematical, logical or any other instructions required by apparatus 300 or any of it subcomponents.

In some embodiments, apparatus 300 may comprise an MMI module 308. MMI module 308 may be utilized for receiving input or providing output to and from the apparatus, for example receiving specific user commands or parameters related to the apparatus, storing and retrieving information to and from a database, providing output for viewing materials and other data, or the like.

In some exemplary embodiments, apparatus 300 may comprise one or more storage devices such as storage device 312. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause processor 304 to perform acts associated with any of the steps of method 200, for example storing the received material names or descriptions, determining further materials or hazardous materials that can be produced, or the like. In some embodiments, memory 312 may comprise system data 316 comprising information about materials processes and the like.

In some embodiments, system data 316 may comprise a multiplicity of data items, which may be arranged, for example, as a set of tables. The tables may be arranged as part of any proprietary or commercially available database, such as Oracle, MS Access, or the like.

The tables listed below are enumeration tables, which assign numeric or other discrete indicators to possible values of properties relevant to materials, thus facilitating mathematical or logical operations with the values. The tables may include:

Material color table, which enumerates material colors;
Aggregation state table, which enumerates possible states of aggregation;
Transparency table, which enumerates possible transparency degrees;
Grain shape table, which enumerates possible grain shapes;
Grain size table, which enumerates possible grain sizes;
Oiliness table, which enumerates possible oiliness degrees;
Density table, which enumerates possible density degrees;
Hazardous material groups table, which enumerates known groups of hazardous materials;
Hazardous material family table, which lists families of related materials;
Base material groups table, which enumerates known groups of base materials;
Danger ranking of hazardous material groups, which provides a danger rank for each hazardous material group;
Toxicity table, which enumerates possible degrees or types of material toxicity;
Sensitivity table, which enumerates possible degrees or types of material sensitivity;
Known usages table, which enumerates known usages for materials, such as various industrial usages, military usages, pyrotechnic usages, or the like;
Storage conditions table, which enumerates storage conditions, such as room temperature, sealed container, etc.;
Process types table, which enumerates known processes, such as heating, cooling, electrolyzing, grinding. Mixing, etc.;
Material types table, which enumerates types of materials, such as base material, intermediate material, dual material or hazardous material;
Process conversion table, which lists known findings and possible conversions from findings to processes, such as refrigerator→cooling, etc.;
Material conversion table, which lists known findings and possible conversions from findings to materials, such as nail polish→acetone, etc.; and
Status table, which lists the possible status of data entering, such as active, inactive, etc.

As mentioned, the tables listed above are enumerative general, and merely list the available values for various properties or parameters. The material table detailed below makes use of the values of the properties or parameters above, so that entries in the material table may refer to the values as appearing in the tables above. In alternative embodiments, the material table can contain value names rather than enumerated values.

The material table may include for each known material, values for the following fields: material type, material name, alias name or names, a picture of the material, an empiric formula of the material, a graphic representation of the material formula, a UN number which relates to identifying hazardous substances and articles in the framework of international transport, a Chemical Abstracts Service (CAS) number, spectroscopic data associated with the material, the color of the material which may refer to the color table, the oiliness of the material which may relate to the oiliness table, the material state of aggregation which may refer to the aggregation state table, the material density which may refer to the density table, danger ranking which may refer to the danger ranking of hazardous material groups table, toxicity which may refer to the toxicity table, sensitivity which may refer to the sensitivity table, known usages which may refer to the known usages table, and storage conditions which may refer to the storage condition table. It will be appreciated that one or more materials may not have values for one or more fields.

The apparatus may further comprise an Input/Output (I/O) device 320 such as a terminal, a display, a keyboard, an input device or the like to interact with the system, to invoke the system and to receive results.

It will be appreciated that the steps and blocks in the disclosed flowcharts or block diagrams, or combinations thereof may be implemented by one or more sets of interrelated computer program instructions, which may be developed using any programming language and under any development environment. The computer program instructions may be provided to a general purpose computer, special purpose computer, or any other programmable processing apparatus to produce a machine, such that the instructions, which execute via the processor create means for implementing the functions specified in the flowcharts or block diagrams.

The computer program instructions may also be stored on a computer-readable medium to produce an article of manufacture.

The apparatus comprises input components 324 for receiving names or properties of materials found at a scene, computation components 344 for determining target materials that can be produced from the materials found on the scene, and output component 356 for displaying to a user the target materials determined, the materials found on the scene, other materials that can be produced from materials found on the scene, information related to any of the abovementioned materials, or the like.

In some embodiments, input components 324 comprise material name reporting component 328, for receiving from a user the name of a material found at the scene, when the name is known. In some exemplary embodiments, the material name can be selected from a predetermined list, for example the names appearing in the material tables, in order to avoid situations in which the user enters an unknown name, or misspells a name.

Input components 324 may comprise material description reporting component 332, in which a user enters properties related to a material found on the scene, such as color, aggregation state, grain size, or the like. In some embodiments, the property descriptions can be limited to predetermined values, such as the values appearing in the color table.

Input components 324 may comprise finding reporting component 336, which is useful in receiving information about findings at the site. The findings may be limited to predetermined values, such as the entries appearing in material conversion table or in process conversion table.

Yet another optional component of input components 324 is interface to spectroscopic equipment 340, which may provide information relates to spectroscopic characteristics of materials found at the scene. The characteristics may enable the unequivocal identification of material, which can be used for deducing the existence of material at the site, or probabilities thereof.

Input components can also comprise database populating component 342, which may be used offline to prepare the system for operation, or from time to time to update the system with new information. In some embodiments, database populating component 342 may be used at the lab or office rather than at the scene. Database populating component 342 can be used by a person such as a chemist in order to make the knowledge available to the person at the scene who may not have such knowledge. The knowledge may be entered as the contents of one or more tables listed in association with system data 316.

In some exemplary embodiments, computation components 344 may comprise found material search and scoring component 348, for identifying possible materials upon partial data, such as data entered through description reporting component 332 or interface to spectroscopic equipment 340. The materials may be determined by matching the reported properties or spectroscopic data received by input components 324 with system data 316.

Since the information may not be complete, for example insufficient number of properties was entered, or the entered properties may be characteristic of more than one material, then multiple materials can be indicated, each optionally associated with a score. For example, a material for which more properties have been matched, or that better matches the spectroscopic data of a material, will be assigned a higher score than material for which fewer properties match or have been reported, or that has lower match with the spectroscopic data.

Computation components 344 further comprise material signature scoring component, for comparing materials available at the scene and required for producing a target material and optionally the score associated with each material, against the signature of each target material, for determining a degree of certainty that the materials found at the scene are used or may be used for producing the target material. The operation of computation components 344 is further detailed in association with FIG. 5 below.

Output components 356 may be designed in a multiplicity of manners. In some exemplary embodiments, output components 356 comprise material list presentation component 360 for displaying to a user a material list, comprising for example sub lists of materials found at the scene, intermediate materials that can be produced from materials found on the scene, hazardous materials that can be produced, or the like. Optionally each material may be displayed with a score indicating a certainty degree that the material was indeed found or that the found materials may be used for producing the target material. It will be appreciated that the list may include any one or more materials that were assigned the highest score of all materials. In some embodiments, only the materials that were assigned the highest score, and are hazardous are displayed.

Output components 356 may further comprise material description presentation component 364, for presenting information related to each material which may include for example any material selected from the list displayed by list presentation component 360. For each such material, all its related information may be displayed, including for example its properties as stored in system data 316, its picture if available, its possible recipes and indications to which of the required materials is available at the scene, and/or any other information.

It will be appreciated that the disclosed methods and block diagram are exemplary only, and that multiple variations can be designed without deviating from the invention. In particular, multiple steps or elements can be combined into one step or one element, a single step or element can be split into a multiplicity of elements, steps may be performed in different order, or the like.

Referring now to FIG. 4, showing an illustration of an exemplary input screen 400 enabling a user to input into the system data related to materials.

It will be appreciated that screen 400 is exemplary only, and that numerous other user interfaces can be designed to receive the relevant information from a user.

It will be appreciated that the user interface can also provide a user with further options not shown in FIG. 4, such as options to review and confirm/reject spectroscopic information obtained from a spectroscope, to introduce findings related to equipment, or the like.

FIG. 4 shows a screen 400, generally divided into a number of panes. On pane 404 input is received from a user regarding which type of evidence the user wishes to add to the system, and the other panes show the evidence that has already been input. Any of the input materials can be deleted by clicking on a delete button next to the material such as delete button 428.

Using pane 404, the user can select any of radio buttons 408, 412, 416 or 420 in order to add evidence comprising material name, material properties, a finding or spectroscopic data, respectively.

Pane 424 shows a material 436 as input by its name, being Aluminum in the case of FIG. 4. The user can select the material out of the materials known to the system by activating a drop down list using control 432.

Panes 440 and 468 show other materials, as input in accordance with their properties. The available options for introducing properties may change in accordance with values entered for other properties.

For example, pane 440 describes a material of solid aggregation state as selected using control 444, and of Black color as selected using control 452. Since the material is solid, the user can input its grain size by selecting any of the values shown when activating control 460.

Pane 468, however, describes a material of liquid aggregation state as selected using control 472, and of green color as selected using control 476. Since the material is liquid, the user can input its viscosity by selecting any of the values shown when activating control 480.

Pane 488 relates to receiving data related to a finding, in which the user selects a finding from a drop down list opened when control 492 is used.

Pane 490 may comprise one or more controls, such as "submit" button 498 which submits the information and may start a search, "cancel" button 499, or the like.

Figure 5:
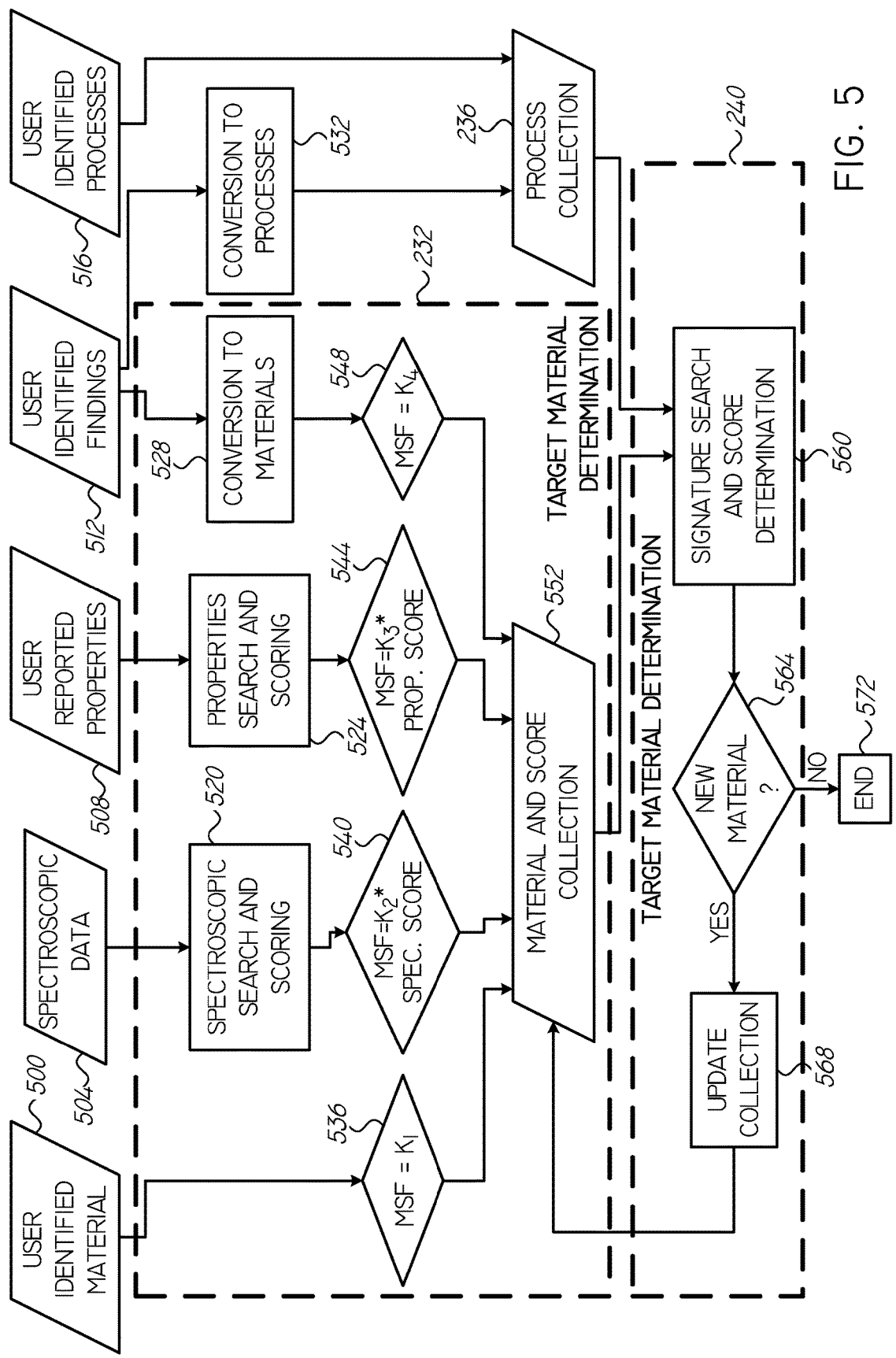
FIG. 5 is a flowchart of steps in a method for determining the probability of production of hazardous materials in a scene, in accordance with some exemplary embodiments of the invention.

Referring now to FIG. 5, showing a flowchart of steps in a method for determining whether and which one or more hazardous materials may be produced from materials and equipment found at a scene, and in particular detailing material searching step 232 and further material determination step 240.

The method receives as input one or more of the following data: one or more user identified materials 500 found at a scene, wherein in some embodiments each such material is selected from a list of predetermined materials; spectroscopic data 504 which relates to one or more materials found at a scene; user reported properties 508, comprising one or more properties related to one or more materials found at a scene; user identified findings 512 which relate to one or more materials or pieces of equipment found at the scene; and user identified processes 516 which indicate the option to perform processes at the scene, for example grinding.

It will be appreciated that while the description refers to a "scene", this is not limited to a particular physical area such as a room. Rather, any number of areas, for example a number of locations that may belong to the same person or institute may constitute a single scene, wherein the materials may be spread between the locations in order to maintain secrecy, prevent accidents, conceal mal intentions, or the like.

The input types which do not indicate a specific material undergo corresponding searching steps. For example, on spectroscopic search and scoring step 520, spectroscopic data 504 is searched for in material table, and possible corresponding materials are determined. In some embodiments, for example when the material is not pure or contains a mixture, the spectroscopic analysis may provide multiple answers, in which case a score may be assigned to one or more of the determined materials, in accordance with the level of correspondence between the received spectroscopic data and the spectroscopic data associated with the materials.

Similarly, on properties search and scoring step 524, the material table is searched for one or more materials that match the user identified properties 508 to some degree. In some embodiments, a score is assigned to each determined material, in accordance with the level of correspondence between the input properties and the properties associated with the material. The scoring can employ a uniform weight for each property, or different weights for various properties. The score may be a sum or any other combination of the similarity between each identified property and the property value in the material table. The score may also take into account additional factors, such as the price of the material, the found quantity, or the like.

User identified findings 512 are searched for materials on conversion to materials step 528, using material conversion table. User identified findings 512 may also be searched for processes on step 532 using process conversion table.

Each identified material, whether it was associated with a score on step 520 or 524 or not, is then associated with a material score factor (MSF), which may take into account the score if determined on step 520 or 524, and a coefficient. The coefficient may relate to the source of the information.

Thus, on step 536 each user identified material 300 may be assigned an MSF=$K_1$, wherein $K_1$ may be as high as one (1.0) since there is high confidence that the user indicated the correct material.

On step 540, materials identified according to their spectroscopic data may be associated with a coefficient $K_2$, which may also be as high as one (1.0), since the spectroscopic data is assumed to be objective and reliable. The MSF assigned to the material on step 540 may be obtained, for example by multiplying the score obtained on step 520 by $K_2$.

On step 544, materials identified according to their properties may be associated with a coefficient $K_3$, which may be, for example 0.6 or any other number, since the properties data may sometimes be subjective and may therefore be given lower confidence than spectroscopic data. The MSF assigned to the material on step 544 may be obtained, for example by multiplying the score obtained on step 524 by $K_3$.

On step 548, materials identified using material conversion table may be assigned an MSF equal to $K_4$, for example 0.7.

The materials and associated MSFs are collected into material and score collection 552.

The processes obtained on step 532, as well as processes 516 identified by a user are collected into process collection 536.

On signature search and score determination step 560, each material in the database, referred to as target material, is scored against material and score collection 552 and against process collection 536. The scoring is done using all the recipes available for the target material, wherein each such recipe comprises one or more materials and one or more processes. The score associated with each target material represents the probability that the materials and equipment found on the scene may be used for producing the target material. The scoring of a target material against collections 552 and 556 is detailed below.

On step 564, if a target material received on step 560 is assigned a score exceeding a predetermined level, then on step 568 the target material may be added to material collection 552, either with the score assigned on step 560 or with another score.

If no new target materials are determined, the method ends on step 572, and the materials can be presented as disclosed in association with step 244 above.

Otherwise, signature search and score determination step 560 can then be repeated with extended collection 552, in order to determine further new target materials.

Step 560 can be repeated as long as new target materials are determined. In alternative embodiments, step 560 can be repeated at most a predetermined number of times, for example four.

In order to determine the score of a target material, the found materials and processes are compared against the signature of the target material. For example, the accumulated MSF of the found materials may be divided by the number of materials required for producing the target material. The computation can also take into account the number of available processes divided by the number of required processes. The two ratios may be combined into a single score, using different weights.

Thus, the target material score can be represented as:

$$Kmat \times \frac{\sum MSF(\text{required\_and\_available\_materials})}{\text{No.requires\_materials\_in\_target}} +$$

$$Kproc \times \frac{\text{No.required\_and\_available\_processes}}{\text{No.required\_processes\_in\_target}}$$

wherein Kmat is the relative weight associated with the existence of materials required for the target material, and Kproc is the relative weight associated with the existence of equipment useful in the processes required for producing the target material, such that Kmat+Kproc may be equal to one (1.0).

In some embodiments, only materials having MSF exceeding a predetermined level, for example 0.57 are taken into account in the above formula.

In some embodiments, each target may be associated with one or more critical materials, one or more common materials or one or more optional materials, and the ratios presented above may be determined separately for each such group, and each such group may be associated with different weights. The sane or different division may be applied to processes. In this case the formula may be represented as:

Material_score =

$$F_{Crit.mat} \times \frac{\sum MSF(crit.mat.)}{num.crit.mat.} + F_{comm.Mat.} \times \frac{\sum MSF(common.mat.)}{mum.common.mat.} +$$

$$F_{Opt.Mat,} \times \frac{\sum MSF(optional.mat.)}{num.optioanl.mat.} + F_{Crit.proc.} \times \frac{M_{Crit.proc.}}{num.crit.proc.} +$$

$$F_{common.proc.} \times \frac{M_{Common.proc.}}{num.common.proc.} + F_{optional.proc.} \times \frac{M_{optional.proc.}}{num.optional.proc.}$$

wherein:

ΣMSF(crit.mat.) is the accumulated score of the materials found on the scene that match critical materials required for producing the target material;

ΣMSF(common.mat.) is the accumulated score of the materials found on the scene that match common materials in producing the target material;

ΣMSF(optional.mat.) is the accumulated score of the materials found on the scene that match optional materials of producing the target material;

num.crit.mat is the number of critical materials in producing the target material;

num.common.mat is the number of materials common in producing the target material;

num.optional.mat is the number of optional materials in producing the target material;

$F_{crit.mat}$ is the coefficient associated with critical materials;

$F_{common.mat}$ is the coefficient associated with common materials;

$F_{opt.mat}$ is the coefficient associated with optional materials;

$M_{crit.proc}$ is the number of processes that can be performed at the scene and that match critical processes in producing the target material;

$M_{common.proc}$ is the number of processes that can be performed at the scene and that match common processes in producing the target material;

$M_{optioanl.proc}$ is the number of processes that can be performed at the scene and that match optional processes in producing the target material;

num.crit.proc is the number of processes critical for producing the target material;

num.common.proc is the number of processes common in producing the target material;

num.optional.proc is the number of optional processes in producing the target material;

$F_{crit.proc}$ is the coefficient associated with critical processes;

$F_{common.proc}$ is the coefficient associated with common processes;

$F_{op.proc}$ is the coefficient associated with optional processes;

If any of the ratios above is 0/0, it can be assigned any arbitrary value, such as 0, 1/3, or the like.

The above formula can provide high score also for target materials for which not all ingredients are available at a scene. However, since the formula is applied to all target materials in the database, it is valuable for a user to know which target materials are more likely to be produced.

It will be appreciated that different scales of criticality can be defined. For example, a one rank scale can be defined, which includes only the necessary ingredients, a two-rank scale can be defined consisting of required and optional materials and processes, or the like.

In some alternatives, assigning the score to each material found on the scene may be omitted, so that only the number of materials will be taken into account and not their score.

In some embodiments, the score associated with a target material can relate to the iteration number, i.e., how many times signature search and score determination step 560 has been activated with the input data, resulting in new materials being added to the collection until the target material was determined. Optionally, the score associated with materials added on later iterations is lower than the score associated with materials added on earlier ones.

In some alternatives, the formula can also refer to one or more additional factors or rules, for example difficulty or simplicity of producing materials or performing processes, availability of materials, or the like.

For example, if a multiplicity of rare and expensive materials required for producing a hazardous material are found, and only a cheap everyday material is missing which can be easily obtained, there is high probability that the found material may be used for producing the target material even if a required material is missing. If, however, another rare or expensive material is missing, the probability may drop.

In another example, a rule may be defined and applied that if materials A and B are present at a scene, although materials C and D can both be produced, it is more likely that material C is produced than material D.

Figure 6:
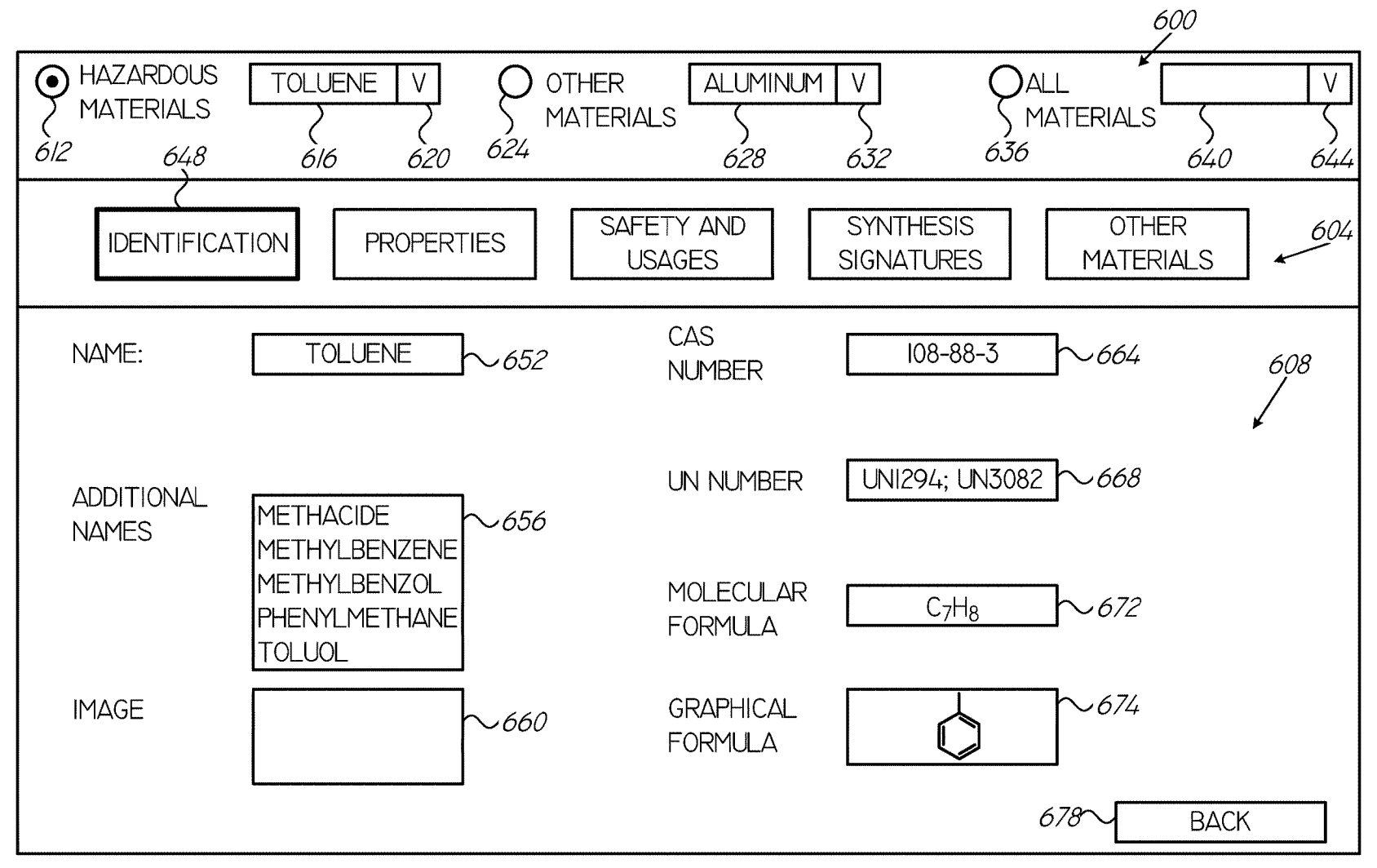

Referring now to FIG. 6 showing an illustration of an exemplary input screen 600 enabling a user to view information related to materials found on the scene, or target materials that can be generated from such materials.

It will be appreciated that screen 600 is exemplary only, and that numerous other user interfaces can be designed to display information to a user. It will be further appreciated that the user interface can also provide a user with additional options not shown in FIG. 6, for example an option to view a list of all the materials found on the scene, all hazardous materials found on the scene, all materials known to the system, or the like.

Screen 600 comprises pane 602 for selecting a material to view, pane 604 for selecting which aspects of the material to view, and pane 608 comprising information related to the selected material.

On pane 602, by clicking any of radio buttons 612, 624 and 636, the user can choose whether he wants to view one of the hazardous materials, one of the non-hazardous materials, or one of all materials found or determined, respectively. For each choice, the user can select the material to view from a drop down list, using controls 620, 632 or 644, respectively. On the exemplary screen shown in FIG. 6, the user has selected to view the hazardous material Toluene 616.

On pane 604, which may be implemented as a multi-tab control, the user can select whether he or she wishes to view the material's identity, properties, safety and usages, or syntheses signatures.

Pane 608 changes in accordance with the selection made on pane 604. In the example shown in FIG. 6, the user selected to view the properties of the material Toluene. Pane 608 thus presents on text box 652 the material name, being Toluene; on text box 656 the additional names, if any, in this case methylbenzene, methacide, methylbenzene, methylbenzol, phenylmethane, and toluol; on image area 660 an image of the material if available; on text box 664 the CAS number for Toluene being 108-88-3; on text box 668 the UN number for Toluene being UN1294, UN3082; on text box 672 the molecular formula being $C_7H_8$; and on area 674 the graphical formula:

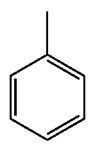

Pane 608 can also comprise any required controls, such as "back" button 678.

Making a different selection on pane 604 would change the appearance and data displayed on pane 608, to display the relevant information.

Unless specifically stated otherwise, as apparent from the above discussions, it is appreciated that throughout the specification discussions utilizing terms such as "processing", "computing", "calculating", "determining", or the like, refer to the action and/or process of a computing system or a similar electronic computing device, that manipulate and/or transform data represented as physical, such as electronic, quantities within the computing system's registers and/or memories into other data similarly represented as physical quantities within the computing system's memories, registers or other such.

Some embodiments may be implemented, for example, using a non-transitory computer-readable medium or article which may store an instruction or a set of instructions that, if executed by a computer (for example, by a hardware processor and/or by other suitable machines), cause the computer to perform a method and/or operations in accordance with embodiments of the invention. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any type of disk including floppy disks, optical disks, CD-ROMs, magnetic-optical disks, read-only memories (ROMs), random access memories (RAMs), flash memories, electrically programmable read-only memories (EPROMs), electrically erasable and programmable read only memories (EEPROMs), magnetic or optical cards, or any other type of media suitable for storing electronic instructions, and capable of being coupled to a computer system bus.

The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, such as C, C++, C#, Java, BASIC, Pascal, Fortran, Cobol, assembly language, machine code, or the like.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step or component to the teachings without departing from the essential scope thereof. Therefore, it is intended that the disclosed subject matter not be limited to the particular embodiment disclosed as the best mode contemplated for carrying out this invention, but only by the claims that follow.

In the description and claims of the application, each of the words "comprise" "include" and "have", and forms thereof, are not necessarily limited to members in a list with which the words may be associated.

What is claimed is:

1. A method for determining a probability that ingredient materials found at a scene can be used for producing a target material, the method comprising:
   operating a computing apparatus located at a scene to access a computerized database that comprises information relating to multiple ingredient materials and multiple target materials;
   operating the computing apparatus located at the scene to receive input related to at least one ingredient material found at the scene, wherein:

the at least one ingredient material is of the multiple ingredient materials in the computerized database, and the input is received from a source selected from the group consisting of:

an ingredient material name, an ingredient material description, a finding, and data received from spectroscopic equipment;

using at least one hardware processor for computing a non-binary material score factor from the input, the non-binary material score factor indicating a probability that the at least one ingredient material is found at the scene;

using at least one hardware processor for computing a target material score associated with a target material, the score indicative of a probability that the at least one ingredient material is used for producing the target material, wherein the target material score is computed as a ratio between a sum of the non-binary material score factor of materials required for producing the target material and detected at the scene, and a number of ingredient materials required for producing the target material; and displaying, on the computing apparatus located at the scene, a name of the target material.

2. The method of claim 1, wherein the non-binary material score factor is (i) multiplied by the ratio to compute the target material score, and (ii) related to the source from which input relates to the ingredient material was received.

3. The method of claim 2, wherein an ingredient material for which input was received by an ingredient material name or from spectroscopic equipment, receives higher score than an ingredient material for which input was received by an ingredient material description or a finding.

4. The method of claim 1, further comprising determining a plurality of target material scores for further target materials, wherein the target material is added to the at least one ingredient material of the further target materials.

5. The method of claim 4, further comprising displaying a list of the plurality of target materials, the list comprising a target material having a highest target material score.

6. The method of claim 1, further comprising displaying a list of the plurality of target materials which are hazardous, the list comprising a hazardous target material having a highest target material score.

7. The method of claim 1, wherein the target material score is computed as a ratio between a sum of the non-binary material score factor of materials common in producing the target material and detected at the scene by, and a number of ingredient materials common producing the target material.

8. The method of claim 1, wherein the target material score is computed as a ratio between a sum of the non-binary material score of materials optionally used in producing the target material and detected at the scene by, and a number of ingredient materials optionally used in producing the target material.

9. The method of claim 1, wherein the target material score is computed as a ratio between a number of processes required for producing the target material and can be performed at the scene, and a number of processes required for producing the target material, wherein each of the processes is determined by said input comprising at least one equipment finding.

10. The method of claim 1, wherein the target material score is computed as a ratio between a number of processes common in producing the target material and can be performed at the scene, and a number of processes common in producing the target material, wherein each of the processes is determined by said input comprising at least one equipment finding.

11. The method of claim 1, wherein the target material score is computed as a ratio between a number of processes optionally used in producing the target material and can be performed at the scene, and a number of processes optionally used in producing the target material, wherein each of the processes is determined by said input comprising at least one equipment finding.

12. The method of claim 1, wherein the target material is computed from multiple instances of the method, wherein each prior instance of the method further comprises determining at least one intermediate material and computing respective at least one intermediate material score, and wherein the at least one intermediate material and the respective at least one intermediate material score are used as ingredient materials of the subsequent instance of the method.

13. A method for determining a probability that ingredient materials found at a scene can be used for producing a target material, the method comprising:

operating a computing apparatus located at a scene to retrieve, from a computerized database, information relating to: multiple ingredient materials, multiple target materials, and multiple pieces of equipment;

operating the computing apparatus located at the scene to receive input related to at least one ingredient material and at least one piece of equipment found at the scene, wherein:

the at least one ingredient material is of the multiple ingredient materials in the computerized database, the at least one piece of equipment is of the multiple pieces of equipment in the computerized database, and the input as to the at least one ingredient material is received from a source selected from the group consisting of an ingredient material name, an ingredient material description, a finding, and data received from spectroscopic equipment;

using at least one hardware processor for computing a non-binary material score factor from the input, the non-binary material score factor indicating a probability that the at least one ingredient material is found at the scene;

using at least one hardware processor for computing a target material score associated with a target material, the score indicative of a probability that the at least one ingredient material is used for producing the target material, wherein the target material score is computed as the sum of:

(a) a first ratio between the sum of the non-binary material score factor of materials required for producing the target material and detected at the scene, and a number of ingredient materials required for producing the target material, wherein the first ratio is multiplied by a first coefficient;

(b) a second ratio between a sum of the non-binary material score factor of materials common in producing the target material and detected at the scene by, and a number of ingredient materials common producing the target material, wherein the second ratio is multiplied by a second coefficient;

(c) a third ratio between a sum of the non-binary material score factor of materials optionally used in producing the target material and detected at the scene by, and a number of ingredient materials optionally used in producing the target material, wherein the third ratio is multiplied by a third coefficient;

(d) a fourth ratio between a number of processes required for producing the target material and can be performed at the scene, and a number of processes required for producing the target material, wherein the fourth ratio is multiplied by a fourth coefficient;

(e) a fifth ratio between a number of processes common in producing the target material and can be performed at the scene, and a number of processes common in producing the target material, wherein the fifth ratio is multiplied by a fifth coefficient;

(f) a sixth ratio between a number of processes optionally used in producing the target material and can be performed at the scene, and a number of processes optionally used in producing the target material, wherein the sixth ratio is multiplied by a sixth coefficient;

wherein each of the processes is determined by said at least one equipment, and wherein each of the first, second, third, fourth, fifth, and sixth coefficient is non-zero; and displaying, on the computing apparatus located at the scene, a name of the target material.

14. An apparatus for determining a probability that ingredient materials found at a scene can be used for producing a target material, the apparatus comprising:

a non-transitory memory having stored thereon a material database storing information related to multiple ingredient materials and multiple target materials;

at least one input component for receiving data related to at least one ingredient material found at a scene, wherein:

the input component is selected from the group consisting of: a material name reporting component, a material description reporting component, a findings reporting component, and an interface to spectroscopic equipment, and the at least one ingredient material is of the multiple ingredient materials in the computerized database;

a hardware processor configured to execute computer instructions of:

(a) a found material search and score component that identifies the at least one ingredient material and an associated non-binary material score factor, and (b) a material signature scoring component that computes a score associated with at least one target material, the score indicative of a probability that the at least one ingredient material is used for producing the at least one target material, wherein the score is computed as a ratio between a sum of the non-binary material score factor of materials required for producing the target material and detected at the scene by the found material search and score component, and a number of ingredients required for producing the target material; and an output component for displaying a name of the target material.

15. The apparatus of claim 14, wherein the target material score is computed as a sum of at least two ratios, each of the at least two ratios multiplied by one of a plurality of coefficients, the at least two ratios selected from the list consisting of:

the ratio between the sum of the non-binary material score factor of materials required for producing the target material and detected at the scene, and a number of ingredient materials required for producing the target material;

a ratio between a sum of the non-binary material score factor of materials common in producing the target material and detected at the scene by, and a number of ingredient materials common producing the target material;

a ratio between a sum of the non-binary material score factor of materials optionally used in producing the target material and detected at the scene by, and a number of ingredient materials optionally used in producing the target material;

a ratio between a number of processes required for producing the target material and can be performed at the scene, and a number of processes required for producing the target material;

a ratio between a number of processes common in producing the target material and can be performed at the scene, and a number of processes common in producing the target material; and a ratio between a number of processes optionally used in producing the target material and can be performed at the scene, and a number of processes optionally used in producing the target material;

wherein each of the processes is determined by said input comprising at least one equipment finding.

16. The apparatus of claim 14, wherein the target material is computed from multiple instances of the searching and scoring, wherein each prior instance of the searching and scoring further comprises determining at least one intermediate material and computing respective at least one intermediate material score, and wherein the at least one intermediate material and the respective at least one intermediate material score are used as ingredient materials of the subsequent instance of the searching and scoring.

17. A computer program product comprising:

a non-transitory computer readable medium;

a first program instruction configured to operate a computing apparatus located at a scene to access a computerized database that comprises information relating to multiple ingredient materials and multiple target materials;

a second program instruction configured to operate the computing apparatus located at the scene to receive input related to at least one ingredient material found at the scene, wherein:

the at least one ingredient material is of the multiple ingredient materials in the computerized database, and the input is received from a source selected from the group consisting of an ingredient material name, an ingredient material description, a finding, and data received from spectroscopic equipment;

a third program instruction configured to compute a non-binary material score factor from the input, the non-binary material score factor indicating a probability that the at least one ingredient material is found at the scene; and a fourth program instruction configured to compute a target material score associated with a target material, the score indicative of a probability that the at least one ingredient material is used for producing the target material, wherein the target material score is computed as a ratio between a sum of the non-binary material score factor of materials required for producing the target material and detected at the scene, and a number of ingredient materials required for producing the target material; and a fifth program instruction configured to display, on the computing apparatus located at the scene, a name of the target material;

wherein said first, second, third, fourth and fifth program instructions are stored on said non-transitory computer readable medium.

\* \* \* \* \*